United States Patent [19]

Black

[11] 4,305,780

[45] Dec. 15, 1981

[54] HOT AIR DRUM EVAPORATOR

[75] Inventor: Roger L. Black, Idaho Falls, Id.

[73] Assignee: The United States of America as represented by the United States Department of Energy, Washington, D.C.

[21] Appl. No.: 206,232

[22] Filed: Nov. 12, 1980

[51] Int. Cl.³ .............................................. B01D 1/14
[52] U.S. Cl. ................................ 159/16 R; 159/13 R; 159/4 D; 159/1 C; 159/DIG. 12; 252/632
[58] Field of Search ................. 159/16 R, 16 S, 13 R, 159/4 VM, 40, 1 C, DIG. 12; 252/301.1 W, 631, 632

[56] References Cited

U.S. PATENT DOCUMENTS

| | | | |
|---|---|---|---|
| 496,615 | 5/1893 | Monsanto | 159/16 R |
| 625,109 | 5/1899 | Koenig et al. | 159/13 R |
| 2,809,820 | 10/1957 | Stoops | 159/16 R |
| 3,033,541 | 5/1962 | Belkin | 159/16 R |
| 3,206,379 | 9/1965 | Hill | 159/16 R |
| 3,393,133 | 7/1968 | Baird | 159/13 R |
| 4,246,065 | 1/1981 | Chirico | 159/DIG. 12 |

FOREIGN PATENT DOCUMENTS 2629581 12/1978 Fed. Rep. of Germany ...... 252/632

Primary Examiner—Norman Yudkoff
Attorney, Agent, or Firm—James W. Weinberger; Walter L. Rees; Richard G. Besha

[57] ABSTRACT

An evaporation system for aqueous radioactive waste uses standard 30 and 55 gallon drums. Waste solutions form cascading water sprays as they pass over a number of trays arranged in a vertical stack within a drum. Hot dry air is circulated radially of the drum through the water sprays thereby removing water vapor. The system is encased in concrete to prevent exposure to radioactivity. The use of standard 30 and 55 gallon drums permits an inexpensive compact modular design that is readily disposable, thus eliminating maintenance and radiation build-up problems encountered with conventional evaporation systems.

20 Claims, 1 Drawing Figure

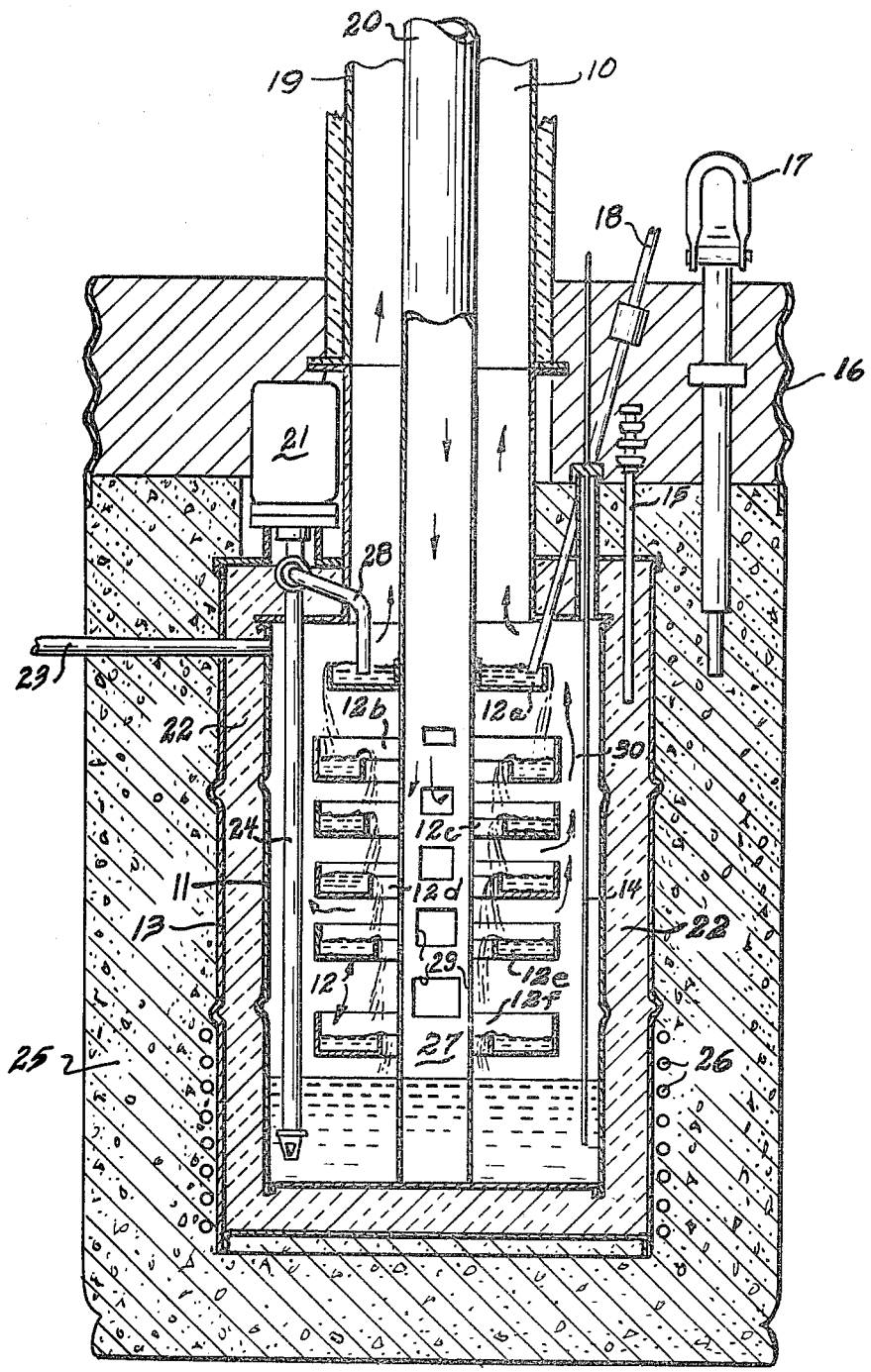

HOT AIR DRUM EVAPORATOR

The United States Government has rights in this invention pursuant to Contract No. W-31-109-ENG-38 between the U.S. Department of Energy and Argonne National Laboratory West.

BACKGROUND OF THE INVENTION

The invention relates to an evaporation system for handling aqueous radioactive wastes. More specifically, the invention relates to a disposable evaporation system using standard 30 and 55 gallon drums as containment vessels for an adiabatic saturation process wherein moisture is absorbed by hot dry air moving through cascading spray and over standing liquid.

Recently, considerable interest has been generated in the handling of toxic nuclear waste materials. Certain commercial evaporation systems for reducing the volume of moderate quantities of low level nuclear wastes require personnel exposure to radioactive material during repair and servicing making such work difficult if not impossible. A disposable unit would require fewer handling operations; and consequently, less personnel exposure to radioactive material. Present commercial units are too large and expensive to be treated in a disposable manner.

SUMMARY OF THE INVENTION

It is an object of this invention to provide an evaporation system for reducing the volume of aqueous radioactive wastes.

It is a further object of the invention to provide an evaporation system which eliminates maintenance and radiation build-up problems encountered with conventional evaporation systems.

Another object of the invention is to provide an evaporation system using inexpensive component parts to permit a disposable compact modular design with improved evaporating capabilities.

The present invention provides a disposable compact modular system for reducing the volume of radioactive liquid wastes, a containment vessel for long-term storage of waste and reduces personnel exposure or maintenance over existing techniques.

In accordance with the features of the invention, standard 30 and 55 gallon drums may be used to house the major component parts of the invention and to serve as long-term storage vessels for radioactive material. Within a drum, waste solutions, heated or unheated, pass over a series of vertically arranged, donut-shaped trays as cascading water sprays, thereby increasing the air water interface. A down-draft of heated air moving through the center of the drum removes water vapor in an adiabatic saturation process in which relatively dry air picks up moisture. An air distribution manifold delivers air at low velocity to the space between adjacent trays in radial flow. The humidified air is removed from the drum and passed through a double high efficiency filter to assure no radioactive particles escape in the process. Free liquid within the drum is recirculated by a pump and heated by the heating coils to speed the evaporation process. The drum is surrounded by a 2-inch layer of fiberglass insulation and is packed in a larger drum. The larger drum is encased in concrete providing a shield. A moisture absorbant is packed inside the unit and the unit is then sealed prior to shipment for storage.

It is understood that the present disclosure is to be considered as an exemplification of the principals of the invention and is not intended to limit the invention to the embodiment illustrated.

BRIEF DESCRIPTION OF THE DRAWING

The invention will be better understood when considered with the attached sectional drawing of the drum evaporator of the present invention depicted as particularly suited for use with radioactive wastes.

DESCRIPTION OF THE PREFERRED EMBODIMENT

The hot air drum evaporator of the present invention generally designated in the drawing by reference numeral 10 has the following major components: a containment vessel or drum, an air distribution manifold, holding trays, a recirculating pump, inlets and outlets for air and an inlet for waste solutions. The evaporator will be described as processing aqueous solutions although the system could also be used for other liquids as well. As described, the specific embodiment uses a cylindrical 30 gallon drum 11. Donut-shaped or toroidal holding trays 12 are positioned coaxially within the drum 11 to form a vertical stack. As depicted in the drawing, there are six trays 12, a–f, spaced apart from each other and from the top and bottom of the drum 11. Each tray has a circular outer wall and a circular inner wall along the diameters of the toroid. The upper tray 12a has an outer diameter that is smaller than the outer diameter of the tray below 12b. The height of the outer wall of the upper tray 12a along the outer diameter is less than the height of the inner wall along the inner diameter to form a dam or gate forcing excess water filling the upper tray to flow or cascade over the edge along the outer diameter where it falls in counter current flow past an updraft of hot air running along the side of drum 11 and is then primarily collected in tray 12b located below. The inner wall of the top tray 12a is sealed against the air distribution manifold 27. Tray 12a acts as a baffle directing any central updraft of air from lower trays radially outwardly through the cascading water as will be understood.

Each of the trays 12b–12f is also formed in the shape of a toroid. However for trays beneath the top tray, the diameters of all outer walls are equal and the diameters of the inner walls reduce progressively from an upper to a lower tray. A lower tray catches the water cascading from the next higher tray. Further, in these trays the inner wall has reduced height and acts as the gate. The cascading water and spray increases the surface area of the water exposed to the hot dry air and thereby increases the rate of evaporation. It will be observed that the air flows radially outwardly along the upper surface of the water stored in a tray and through the cascading spray which is generally circular in horizontal section.

There are many ways to mount the toroidal trays 12 in the vertically stacked coaxial relation of the illustrated embodiment. The trays 12 may each differ from the other in the size of the inner or outside diameters or the trays may be of uniform size as long as some part of the lower trays lies beneath the water falling from the tray above so as to catch it. Trays having identical dimensions in both diameters may be offset from each other.

A pump tube 24 extends down the length of the drum and is connected to the pump motor 21 located at the top of the drum 11. Water from the bottom of the drum 11 is pumped up through the pump tube and out an exit tube 28 positioned such that the water is recirculated and deposited into the top tray 12a. A liquid fill pipe 18 extends into the drum 11 and is positioned such that water flowing through the fill pipe will also enter the upper tray 12a.

An air distribution manifold 27 extends down the center of the drum 11 through the holes of the toroidal trays 12 and protrudes through the top of the drum where it is connected to an air inlet tube 20. The air inlet tube 20 is connected to a source of forced air. The air distribution manifold 27 is equipped with openings 29 about its length located above and in close proximity to the position of the toroidal trays 12. There are no air distribution openings in the manifold above the top tray 12a. This prevents the hot air that would come through such an opening from being withdrawn immediately by the outlet tube 19. Water from the top tray 12a contacts hot air in counter current flow as the water cascades over the peripheral dam of the top tray from the updraft of air circulating along the side of the drum. In this embodiment, tray 12a acts as a baffle directing air radially outwardly through the cascading water due to its tight fit around the manifold 27. There are many ways to block the central updrafts of hot air and directing the air through the water cascades of the baffle means will depend on the manner of mounting the toroidal trays 12. Air leaving the primary drum 11 will pass over the standing water in the top tray 12a.

As depicted in the drawing, the openings 29 are of increasing size as the manifold extends down towards the bottom of the drum 11 such that an equal mass of air is delivered to each tray as air is forced through the manifold at a low velocity. Relatively dry heated air passes through the air inlet tube 20, through the air distribution manifold 27 where it absorbs moisture by an adiabatic saturation process as it passes over the water temporarily stored in the trays and through the cascading water spray, as illustrated by large arrows 30.

The humidified air is removed from the drum by an air outlet tube 19 connected to an opening in the top of the drum 11. The outlet tube 19 is centered at the top of the drum 11 and around the inlet tube 20 forming a tube within a tube and providing for uniform removal of the humidified air. The air removed from the drum still has a low relative humidity such that at an air temperature of 120° to 130° F. the air can pass through a double high efficiency filter (not shown) located outside the drum evaporator. The high efficiency filters are used to assure that the small amount of radioactivity that may become airborne does not escape.

A level probe 14 extends down the length of the drum 11 and allows for the determination of liquid levels within the drum. An overflow outlet 23 is located near the top of the drum 11 and provides a means whereby radioactive water can be handled in the event of excess filling by returning the excess back to its source or directing it to another evaporator.

A heating coil 26, steam jacket or other heating means is wrapped around the lower area of the 30 gallon drum 11 in order to heat the water standing in the drum. To reduce heat loss of the drum contents, the drum is wrapped in fiberglass insulation 22. The entire 30 gallon drum assembly is placed within a larger 55 gallon drum 13 with an appropriate hole on the side of the drum 13 for the overflow outlet 23 and holes in the top for air inlet 20 and outlet 19 means, liquid fill pipe 18, pump means 21 and level probe 18. The 55 gallon drum 13 is also provided with means of removing steam condensate 15 from the area between the two drums. The steam condensate can be monitored for indications of a leak in the drum 11 or a steam jacket when used as the heating means.

The 55 gallon drum assembly is encased in six inches of high density concrete to provide a high density shield 25. The concrete shield 25 provides for openings for the air inlet 20 and outlet 19 openings, the liquid fill pipe 18, and the overflow outlet 23 as well as providing for electrical connections to the pump 21 and level probe 14. The concrete shield 25 is contained within a 36 inch corrugated metal pipe 16 which provides support for the concrete while it is being poured and also provides structural reinforcement. The corrugated metal pipe 16 extends above the initial concrete shield to provide support for a layer of concrete to be poured during a sealing operation.

Waste solutions, heated or unheated, pass over the series of donut-shaped trays 12 as cascading water sprays. A 200° F. heated downdraft of air passes through the center air distribution manifold 27 and over liquid in the trays 12 and through the cascading water and spray. The air absorbs the water vapor by an adiabatic saturation process in which relatively dry air picks up moisture and is then removed from the drum 11 via the outlet tube 19. The pump 21 inside the drum 11 recirculates all the free liquid over the toroidal trays 12. When used, the heating coil 26 wrapped around the outside of the 30 gallon drum 11 can speed the evaporation process. Evaporation rates of two gallons per hour can be achieved with 400 cubic feet per minute room air heated to 200° F. and up to six gallons per hour with 400 cubic feet per minute room air heated to 200° F. and the water in the drum 11 is heated by a heating coil 26 to 110° F. However, the system is very flexible and can be operated to match radioactive liquid waste accumulation rates for optimum efficiency.

Eventually, radioactive sediment builds up in the bottom of the drum 11 and impairs further use of the evaporator by reducing the evaporation rate. The low cost of the component parts allows the system to be treated in a disposable manner. A moisture absorbant is packed inside the unit and the unit is sealed prior to shipment for storage. In sealing the hot air drum evaporator, the air inlet 20 and outlet 19 tubes are disconnected from the assembly 10 in close proximity to drum 13 as well as connections to the pump motor 21 liquid fill pipe 18, fluid level probe 14, heating means 26 and overflow outlet 23. The air inlet 20 and outlet 19 tubes and the area above the drum 13 defined by the corrugated metal pipe 16 extending upward above drum 13 is filled with concrete, effectively sealing the evaporator contents.

Having thus disclosed in detail preferred embodiments of the invention, persons skilled in the art will be able to modify certain of the structure which has been disclosed and to substitute equivalent elements for those which have been illustrated; and it is, therefore, intended that all such modifications and substitutions be covered as they are embraced within the spirit and scope of the appended claims.

The embodiments of the invention in which an exclusive property or privilege is claimed are defined as follows:

1. A disposable evaporator for aqueous waste comprising:
   a primary cylindrical drum having a top and bottom;

a plurality of toroidal storage trays in a vertically stacked relation within said primary drum, each tray including an upright wall providing a dam over which the fluid contents thereof will flow when said tray becomes full, each tray located beneath an upper tray being constructed and arranged to catch at least some of the liquid flowing over the dam of a higher tray;

a source of heated air;

an air distribution manifold means within said primary drum defining discharge openings between adjacent trays, and manifold means receiving air from said source of heated air and passing it over the contents of said trays and through the cascading sprays; and an air outlet means connected to said container for removing the humidified air therefrom.

2. The apparatus of claim 1 wherein said air distribution manifold means extends down the center of said primary drum within the area defined by the inner diameters of said vertically stacked toroidal trays.

3. The apparatus of claim 1 wherein said openings of said air distribution manifold means are of increasing size as the manifold extends towards the bottom of said primary drum whereby the same amount of air is delivered to each tray as air is driven through the manifold when said manifold is coupled to said source of forced hot dry air.

4. The apparatus of claim 1 further comprising a baffle means above the trays directing updrafts of hot air through the cascading sprays formed by liquid flowing over said trays thereby preventing hot air from being withdrawn immediately upon entering said primary drum without contact with the said liquid.

5. The apparatus of claim 1 further comprising a pump means for recirculating said liquid from the bottom of said drum to said trays.

6. The apparatus of claim 1 further comprising a concrete shield surrounding the primary drum providing a shield for the radioactive material within.

7. The apparatus of claim 1 wherein the air outlet means is a tube connected to the primary drum at an opening in the center of the top of said primary drum to provide uniform air flow within said primary drum and preventing areas of stagnant air.

8. The apparatus of claim 1 further comprising a means to heat the free liquid contained in the bottom of the primary drum thereby speeding the evaporation process.

9. The apparatus of claim 8 further comprising a layer of insulation around the primary drum and said primary drum and insulation are contained within a second larger drum thereby facilitating the heating of said primary drum and its contacts.

10. The apparatus of claim 9 further comprising a concrete shield surrounding the second larger drum providing a shield for the radioactive material within.

11. The apparatus of claim 9 wherein the primary drum is a 30 gallon drum and the second drum is a 55 gallon drum.

12. The apparatus of claim 1 wherein of the toroidal trays, the top tray has an outer diameter smaller than the outer diameter of the tray below and the wall along the outer diameter of the upper tray is lower than the wall along the inner diameter forcing excess liquid filling the upper tray to flow over the wall along the outer diameter where it cascades and is collected in the tray below, said upper tray is sealed against said air distribution manifold to direct central updrafts radially outward through said cascading liquids, and wherein said trays below the top tray vary in the size of the inner diameter and are arranged in a stepped manner with trays having larger inner diameters above trays with smaller inner diameters and the walls of the lower trays along the inner diameter are lower than the walls along the outer diameter forcing excess liquid over the inner walls where it is collected in the tray below until the liquid reaches the bottom of said primary drum and wherein said air distribution manifold extends down within the area defined by the inner diameters of said toroidal trays and directs heated air through cascading liquid and then over contents of said trays, and heated air then moving between the area defined by the inner wall of said primary drum and outer walls of said toroidal trays where it passes a counter current of cascading liquid from said top tray over the standing liquid in said tray, and is then removed from said drum by said air outlet means.

13. The apparatus of claim 12 wherein the openings between adjacent trays are of increasing size as the manifold extends towards the bottom of said drum whereby the same amount of air is delivered to each lower tray as air is driven through said manifold when said manifold is coupled to a source of forced hot dry air.

14. The apparatus of claim 12 further comprising a pump means for recirculating said liquid from the bottom of said drum to said trays.

15. The apparatus of claim 12 further comprising a concrete shield surrounding the primary drum providing a shield for the radioactive contacts.

16. The apparatus of claim 12 wherein the air outlet tube is connected to the primary drum at an opening in the center of the top of said primary drum to provide uniform air flow within said primary drum.

17. The apparatus of claim 12 further comprising a means to heat the free liquid contained in the bottom of the cylindrical drum.

18. The apparatus of claim 12 further comprising a layer of insulation around the primary drum and said primary drum and insulation are contained within a second larger drum.

19. The apparatus of claim 18 further comprising a concrete shield surrounding the second larger drum.

20. The apparatus of claim 18 wherein the primary drum is a 30 gallon drum and the second drum is a 55 gallon drum.

* * * * *